(No Model.) 3 Sheets—Sheet 1.
O. ASCHE.
APPARATUS FOR SOLDERING TIN CANS.
No. 552,809. Patented Jan. 7, 1896.
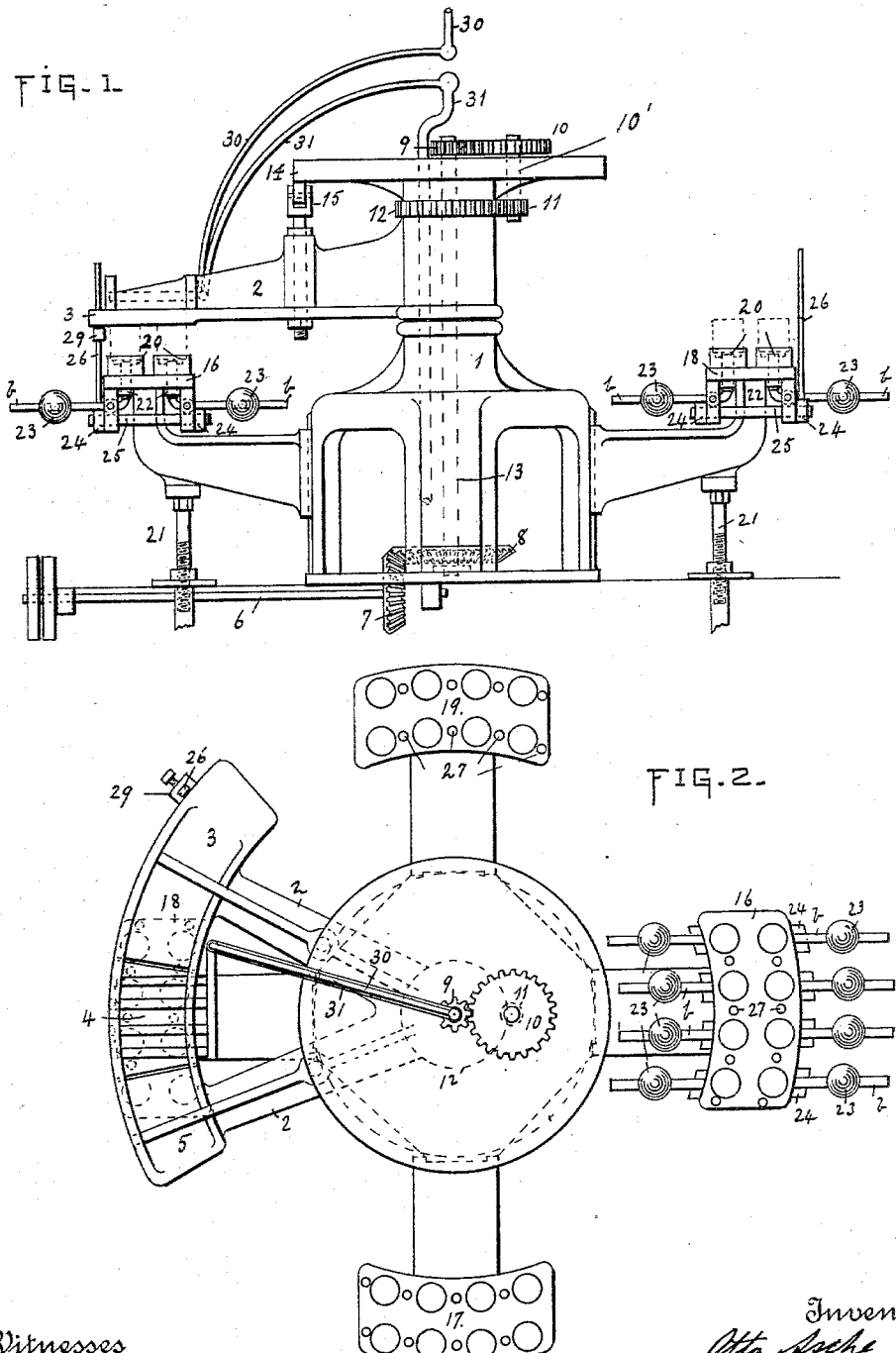
Witnesses
H. N. Jenkins
J. F. Wetmore
Inventor
Otto Asche
by G. Dittmar
Attorney (No Model.) 3 Sheets—Sheet 2.

O. ASCHE.
APPARATUS FOR SOLDERING TIN CANS.

No. 552,809. Patented Jan. 7, 1896.

Witnesses
H. N. Jenkins.
H. F. Wetmore.

Inventor
Otto Asche
by G. Gittman
Attorney (No Model.) 3 Sheets—Sheet 3.
O. ASCHE.
APPARATUS FOR SOLDERING TIN CANS.
No. 552,809. Patented Jan. 7, 1896.
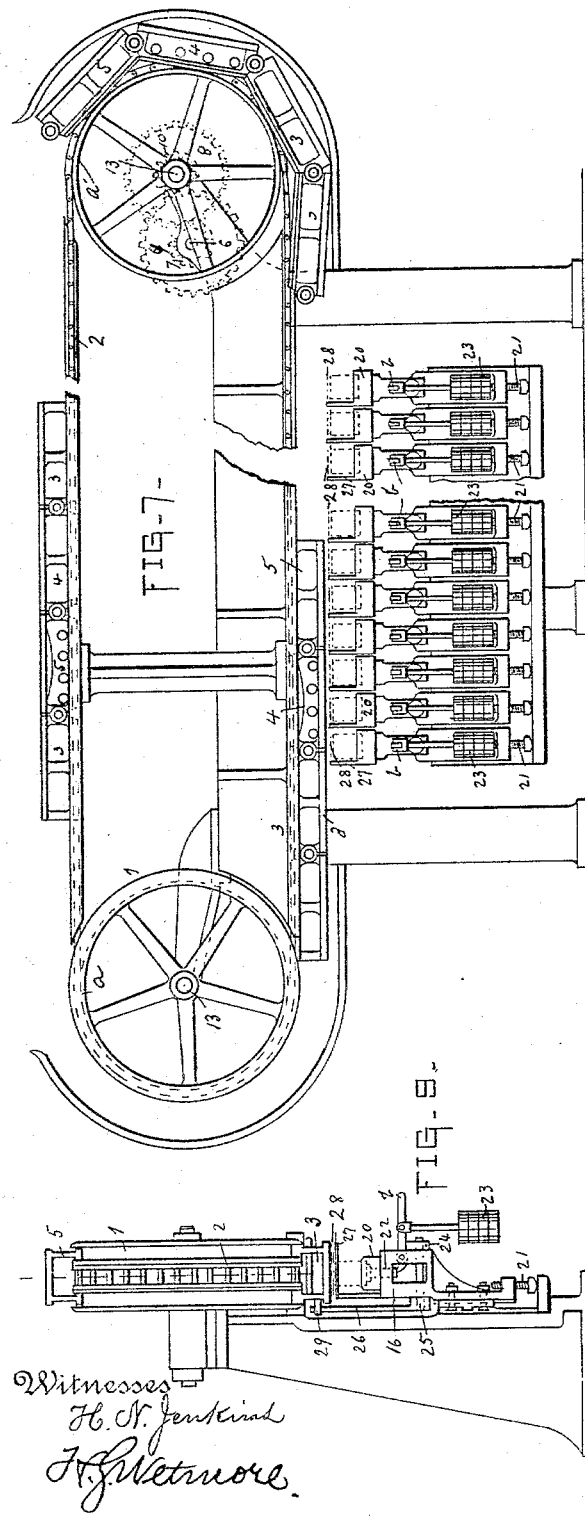
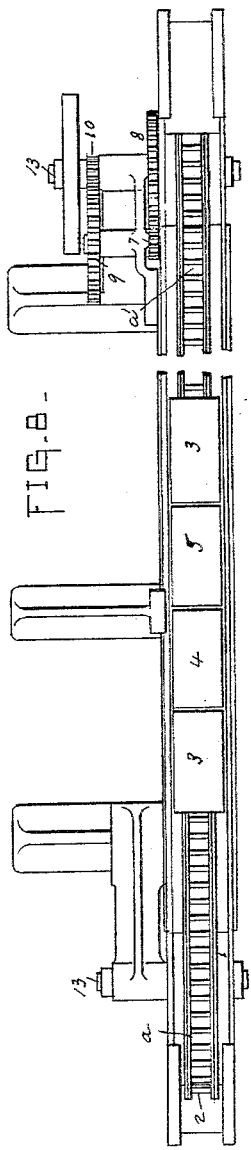
Witnesses
H. N. Jenkins
F. G. Wetmore
Inventor
Otto Asche
by G. Dittmar
Attorney
ANDREW B.GRAHAM, PHOTO-LITHO. WASHINGTON, D.C.

UNITED STATES PATENT OFFICE.

OTTO ASCHE, OF PARIS, FRANCE.

APPARATUS FOR SOLDERING TIN CANS.

SPECIFICATION forming part of Letters Patent No. 552,809, dated January 7, 1896.

Application filed September 20, 1895. Serial No. 563,087. (No model.)

*To all whom it may concern:*

Be it known that I, OTTO ASCHE, a citizen of the Republic of France, residing at Paris, France, have invented certain new and useful Improvements in Apparatus for Soldering Tin Cans; and I do hereby declare the following to be a full, clear, and exact description of the invention, such as will enable others skilled in the art to which it appertains to make and use the same.

This invention relates to a newly-improved apparatus for soldering the ends of tin cans—*i. e.*, the tops and bottoms to the rings or bodies thereof. The cans can be soldered when empty as well as when filled with the substance to be preserved.

The invention will be readily understood by reference to the accompanying drawings, whereon—

Figure 3:
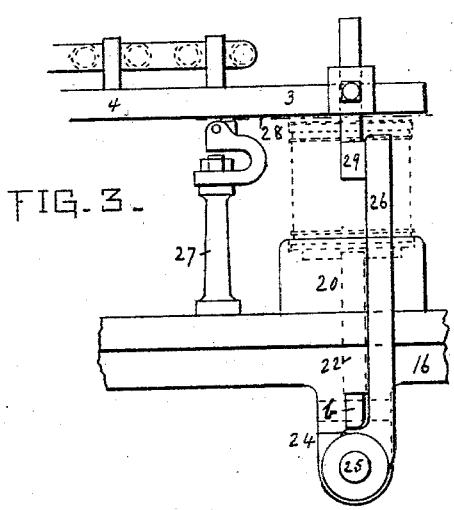
Figure 4:
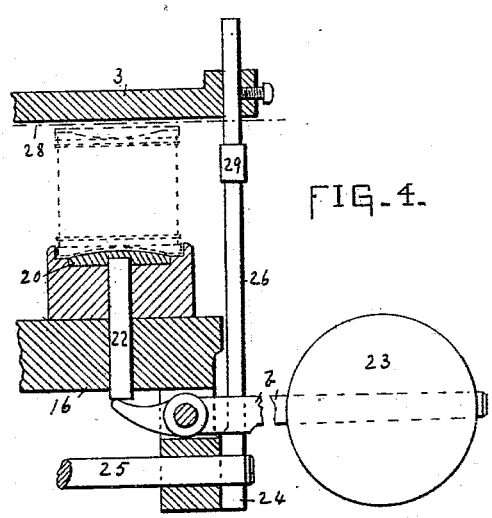

Figure 1 is a side elevation of the machine; Fig. 2, a plan thereof; and Figs. 3, 4, 5, and 6, enlarged detail views of certains parts of the machine, Figs. 5 and 6 being modifications of Figs. 3 and 4. Figs. 7, 8, and 9 are respectively a side elevation, plan, and end view of the machine in modified form.

Referring to the drawings, 1 designates a frame having a vertical central projection around which an arm 2 is adapted to revolve. This arm carries at its outer end a segment composed of plates or tables 3, 4 and 5, the former and latter adapted to be cooled, and 4 to be kept hot during the operation of the machine, as hereinafter fully described.

Above the boss of the arm 2 and cast therewith or otherwise connected thereto is a gear-wheel 12, and above this gear-wheel is secured to the upwardly projecting part of the stand 1 a circular head or plate 14, the outer edge of which serves as a guide for the rollers 15 of the arm 2, and prevents any upward movement of the said arms and connected tables and plates during the soldering process.

Motion is imparted to the arm 2 from the shaft 6 through the bevel wheels 7 and 8, shaft 13, and the gear-wheels 9 10, vertical shaft 10', and gear-wheels 11 and 12, the latter forming part of or connected with the arm 2, as before mentioned.

The frame 1 is also provided with four (or more or less) arms sliding in vertical guides on the main frame, and each provided with an elevating or adjusting screw and nut 21. Each arm carries at its outer end a table or plate, as shown at 16, 17, 18 and 19. The said tables or plates are provided with can-holders 20, which are connected with movable rods or stems 22 and counterbalance-levers *b* having weights, as shown at 23. The can holders are adapted to each receive a can-rim or cylinder, with its cover loosely applied to it, said rim being previously provided with solder in any suitable manner, either by dipping in a bath or by applying a line of solder in form of wire.

The aforesaid levers rest on eccentrics 24 of the shafts 25, and are thereby prevented from acting against the cans, except at such time as they are being soldered. The outer eccentric of each shaft is provided with a lever 26, which is normally arranged in a vertical position, with the greatest projection of its eccentrics uppermost and with the weight-levers *b* resting thereon. At the side of each can-holder is a column 27, having a removable head adapted to receive a thin metal plate 28, being a good conductor of heat, which extends in one sheet or in a number of separate smaller sheets over the cans, and which during the process of soldering is interposed between that end of the can being soldered and the table or plate or the arm 2 traveling over the cans. The cold plate or table 3 being the first to pass over the cans placed upon the carriers 20 of one of the tables 16 17 18 19 is provided with a projecting stud 29, made adjustable in its socket, which coming in contact with the first lever 26 presses same downward, thereby turning the eccentrics of the first shaft, thus releasing the weighted levers and causing same to press the first row of cans against the thin metal plates 28. In continuing the motion the same play is repeated and the second, third, &c., rows of cans are subsequently pressed against the metal plates 28. The hot plate or table 4, heated in any desired manner, next passes over the plates 28, through which the heat is transmitted to the previously-prepared cans. The joints thus formed are next cooled and hardened by the passage of the rear part of the segment or cold plate 5. While the segment passes now over the next of the tables 16 17 18 19, the attendant turns the levers 26 of the table having been operated upon back into the vertical position, thereby supporting the weighted levers $b$ and discharging the cans from the pressure of the weights, which are now again upon the eccentrics. Then he opens the heads of pillars 27 to remove the sheets 28, whereupon he can withdraw the ready cans and replace them by others provided with solder, which he covers up again with the thin plates 28. During this manipulation the segment has soldered the cans upon the adjacent tables, where the attendant repeats the described manipulation.

In the machine shown the gas is admitted by a pipe 30 and cold air by the pipe 31. These pipes can be arranged within or above the frame 1, and each is provided with a universal joint, so as not to injure the connection by the turning of the arm 2.

The machine can be arranged to operate either by hand, foot, or other motive power, requiring no attention other than the placing of the prepared cans in position and the removing of same after the soldering process has been completed.

Figure 5:
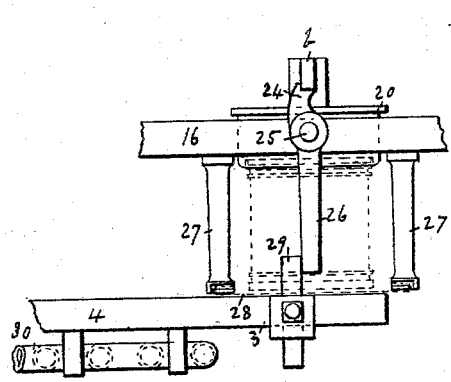
Figure 6:
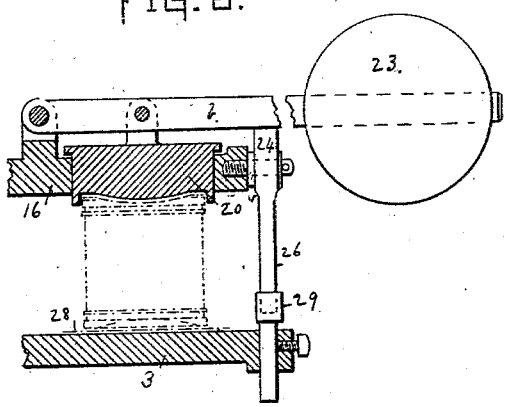

The modifications shown in Figs. 5 and 6 are provided for soldering the cans at the bottom instead of at the top, the said cans being placed on the thin metal plate 28, which is supported by the inverted columns 27, the cold and hot plates of the revolving arm 2 being made to pass beneath same, as shown. This modification offers the advantage that the thin plates 28 need not be removed. The can-carrier 20, having the form of a piston, can be lifted clear out of the table with the lever $b$ and the can can be inserted through the opening, whereupon the carrier or piston 20 is replaced. By lifting up the weight 23 the lever 26 has taken by gravity its vertical position, so that the lever $b$ being turned down again will rest upon the cam 24, taking up the weight and discharging the can and the thin plate from the pressure till the stud 29 disengages said lever and places the weight against the can and the thin plate, being now supported by the traveling segment with the cold or heated plates.

Instead of having the cold and hot plates to operate around a vertical shaft, as above described, the said plates can be hinged together, as at 3 4 5 in Fig. 7, and be secured to an endless chain passing over drums $a$ $a'$ and moving in a straight line over the prepared cans, which are supported in cups 20, on the tables or frames 16, adjustable by the screws 21. Said cups are provided with movable rods 22, adapted to be pressed upward by levers $b$, weighted, as at 23, all as aforesaid, the said levers being held inactive until the eccentrics 24 of shaft 25 have been turned by reason of the projection 29 of the cooling-plate 3 engaging the lever 26 and pressing the same from a vertical to an inclined position. Thus the cans are moved upward and pressed against the thin metal plates 28, which in this case are supported by side plates or columns 27 projecting upward from the can-holders 20, as shown at Figs. 7 and 9.

The cooling-plates 3 and 5 may be simply metallic masses, quickly taking up the ordinary temperature, and the heating-plates 4 may be heated in any convenient manner, either by gas admitted on the side of the machine through flexible pipes, or they may be filled with incandescent charcoal, &c.

Between each series of hot and cold plates a space 2 is left, as shown in Figs. 7 and 8, to give free access to the cans inserted upon the cups 20.

The drums $a$ $a'$ may be loose on the shaft 13 and motion can be imparted to the chain by keying on one of the shafts 13 a crank and a pinion 8, gearing into a cog-wheel 9 on a stub-shaft 6. A second pinion 7 secured to the side of cog-wheel 9 is in gear with a large wheel, forming part of the drum $a'$ or being secured thereto in any suitable manner.

Having described my invention, what I claim as new, and desire to secure by Letters Patent, is—

1. In apparatus for soldering tin cans, a frame having adjustable plates provided with can-holders, a plate of thin metal and means, substantially as described, for holding same against the prepared can ends with a series of movable plates, means for heating and cooling said plates and for bringing same in contact with the thin plate of metal, substantially as specified.

2. In apparatus for soldering tin-cans, a plate provided with can-holders, a thin plate of metal with means for holding same opposite the can holders, and weighted levers with mechanism, for pressing the cans against the thin plate, as described, in combination with movable plates adapted to be heated, or cooled, and to be operated so as to successively come in contact with the aforesaid thin plate, substantially as set forth.

3. In a tin can soldering apparatus, a can-holder and supporting plate, a thin plate and means for holding same opposite the can holder; movable plates adapted to be respectively, heated and cooled, and to be operated so as to successively rest against the thin plate, a weighted lever and can holder connection, as described, in combination with an eccentric adapted to operate against the under side of the weighted lever, and a projection on one of the movable plates to trip the lever, substantially as and for the purpose set forth.

4. The herein described apparatus for soldering tin cans, consisting in a frame having outwardly extended arms and tables, the tables provided with can-holders, and columns having plates of thin sheet metal connected therewith, as described, a weighted lever arranged to operate under each can-holder, and an eccentric with lever, for normally holding the weighted lever inactive, in combination with an arm adapted to revolve around the frame, segmental plates at the end of said arm, air and gas pipes connected with the plates for respectively cooling and heating same, one of the segmental plates provided with a side projection to engage the lever of the eccentric, and thus cause the weighted levers to press the cans to be soldered, toward the cooling and heating plates, substantially as and for the purpose set forth.

In testimony whereof I affix my signature in presence of two witnesses.

OTTO ASCHE.

Witnesses:
J. BRAGES,
CLYDE SHROPSHIRE.